United States Patent [19]

Clark et al.

[11] Patent Number: 4,822,646

[45] Date of Patent: Apr. 18, 1989

[54] SOLID FILM LUBRICANT COMPOSITIONS AND METHODS OF USING SAME

[75] Inventors: Robert N. Clark, Sylvania; Paul W. L. Graham, Toledo, both of Ohio

[73] Assignee: Owens-Illinois Glass Container Inc., Toledo, Ohio

[21] Appl. No.: 111,945

[22] Filed: Oct. 23, 1987

Related U.S. Application Data

[62] Division of Ser. No. 797,267, Nov. 12, 1985.

[51] Int. Cl.$^4$ .......................... B05D 3/02; C03C 39/00
[52] U.S. Cl. ......................................... 427/387; 65/26; 252/29
[58] Field of Search .................... 65/18.2, 901, 26, 29, 65/170, 374.5; 252/12, 12.2, 29, 49, 52 R; 264/338; 427/133, 135, 387

[56] References Cited

U.S. PATENT DOCUMENTS

| | | | |
|---|---|---|---|
| Re. 32,107 | 4/1986 | January | 65/18.2 |
| 3,883,628 | 5/1925 | Martin | 264/54 |
| 4,110,095 | 8/1978 | Stengle | 65/169 X |

*Primary Examiner*—Michael Lusignan

[57] ABSTRACT

A solid film lubricant composition for hot glass contacting surfaces of glass handling equipment and metal molds used in manufacturing glass articles. The solid film lubricant composition is a solution of a solvent, graphite, a solvent-soluble, further curable organopolysiloxane, and NaOH to make the solution alkaline. The solution is easily sprayed on hot glass contacting surfaces such as the interior of the molds to form a coating that is curable at room temperature.

9 Claims, No Drawings

SOLID FILM LUBRICANT COMPOSITIONS AND METHODS OF USING SAME

The present invention is directed to solid film lubricant compositions comprising finely divided graphite, a solvent-soluble, further curable organopolysiloxane, a solvent for the organopolysiloxane, and NaOH to make the solution alkaline, to provide a composition that is stable against premature gelling and a composition that provides a solid lubricant coating for hot glass contacting surfaces of equipment used in the manufacture of glass articles, the coating being curable at room temperature.

BACKGROUND OF THE INVENTION

The Stengle U.S. Pat. No. 4,110,095 (assigned to Owens-Illinois, Inc.) describes a method of making glass articles using a solid lubricant coating for the interior cavity of metal molds. The coating is formed by curing at a relatively high temperature of about 600° F. to 650° F. for about 1 hour to 1½ hours a composition containing graphite, a solvent-soluble, further curable organopolysiloxane, a solvent for the organopolysiloxane, and a butylated melamine/formaldehyde as a siloxane cure promoter. The resultant coatings last for many hours in a glass-making environment including when used as solid lubricant coatings for internal cavities of metal molds for I.S. glass container machines.

Inasmuch as the solid film lubricant coatings must be cured for 1½ hours at 600° F. or so, there is a need for coatings that can be cured at room temperature to avoid an extra processing step of heating the coatings (applied to the molds) that involves the expense of an extra oven. It is also desirable to cure the coatings in as short a time as 15 to 20 minutes or even 30 minutes. A room temperature curable coating for other hot glass contacting surfaces such as bottom plates is highly desirable.

OBJECTS OF THE INVENTION

It is an object of the present invention to provide a solid film lubricant composition containing graphite, a solvent-soluble further curable organopolysiloxane, and a solvent for the organopolysiloxane, the composition being stable against premature gelling and being curable at room temperature in a short time of generally less than ½ hour.

It is an object of the present invention to provide a process that is efficient and cost effective, the process being one for making glass articles such as glass containers by using an easily sprayable solid film lubricant coating composition (comprising graphite, a solvent-soluble further curable organopolysiloxane, a solvent, and NaOH to make the solution alkaline) that is curable at room temperature in as short a time as about 20 minutes to thereby provide a long lasting coating for hot glass contacting surfaces of articles such as mold coatings and eliminating the extra time and cost of heating coated molds at 600° F. to 650° F. F for 1 to 1½ hours to cure the coatings.

These and other objects will be apparent from the specification that follows and from the appended claims.

SUMMARY OF THE INVENTION

The present invention provides a composition adapted for a solid film lubricant for coating hot glass contacting surfaces of hot glass handling and forming articles such as glass forming molds and bottom plates, the composition comprising: (A) a precured concentrated liquid siloxane partial condensation product that is solvent-soluble and further curable; (B) finely divided graphite; (C) a solvent for condensation product, and (D) NaOH generally in an amount of about 1 part by weight of NaOH to about 15 to 20 parts by weight of condensationn product, the composition being stable against premature gelling, and the composition after application, as a coating to the glass contacting surfaces, being curable at room temperature.

The present invention also provides a process for coating hot glass contacting surfaces of forming and handling equipment for making glass articles, the process comprising: (a) forming a hot glass-contacting layer on the glass-contacting surface, the layer comprising graphite dispersed in a thermoset organopolysiloxane binder thereon, said layer having a thickness of about 1½ to about 3 mils, and formed by: (1) applying unto the hot glass contacting surface composition consisting essentially of finely divided graphite dispersed in an organic solvent solution of a solvent-soluble, thermosettable, further curable organopolysiloxane and less than about 15% by weight, based on the organopolysiloxane, of NaOH to make the solution alkaline, said graphite having a particle size of about ½ to 150 microns and at least 90% having a particle size of 44 microns or less, and the weight ratio of said graphite to said organopolysiloxane being between 1/1 to about 2/1, and (2) curing said organopolysiloxane at a temperature as low as room temperature to a cured condition so as to provide said mold coating on the hot glass contacting surface.

In the present invention, the solid film lubricant coating solution composition is made alkaline by NaOH, the NaOH/organopolysiloxane condensation product weight ratio being about 1/15 to 1/20 and preferably about 1/17 to 1/19, with excellent results being obtained at about 1/18.

DESCRIPTION OF THE PREFERRED EMBODIMENTS

The organopolysiloxane condensation product generally has less than about 12.5 SiOH groups to prevent premature gelling. Generally the SiOH content of the condensation product is about 1 up to about 10 to 11 wt. % based on the product, the preferred range being about 7 to 8 up to about 8.5 or 9. Excellent results have been obtained with a condensation product having about 8.5 wt. %. Generally, some SiOH groups are needed because a product with no SiOH groups, (for instance, a product with SiOH groups capped) is not satisfactory.

The aforementioned Stengle U.S. Pat. No. 4,110,095 is hereby incorporated by reference especially for the description of the graphite, the application of the coating to metal molds, the glass manufacturing process using the solid film lubricant for the metal molds, and the useful organopolysiloxanes. The preferred organopolysiloxane herein is R630 resin, a resin dislcosed in U.S. Pat. No. 4,110,095. This resin is a solvent-soluble, further curable hydrolysis product of methyltriethoxysilane, phenyltriethoxy silane and dimethyldiethoxysilane. The condensation product is preferably formed of about 0.5 to 0.7 moles of methyltriethoxysilane, about 0.5 to 0.7 moles of phenyltriethoxysilane, and about 0.7 to 0.9 moles of dimethyldiethoxy silane. One of the most preferred organopolysiloxanes is made with 0.8 moles of dimethyl diethoxysilane and 0.6 moles each of the other two silanes.

As is known in the art, the amount of water used in the hydrolysis is generally about 1½ to 2 up to 7 moles of water and preferably about 2.1 to 2.4 moles of water per mole of silane. Also known, the hydrolysis catalyst is generally about 5 or 10 up to 700 or 1000 parts expressed as HCl per million parts of silane and water.

Suitable finely divided graphite is described in the Stengle U.S. Pat. No. 4,110,095. Generally the graphite used in the present invention is preferably non-colloidal and has a particle size of as low as about ½ or up to 2 to 5 microns on the lower end and up to about 100 to 150 microns on the upper end. The distribution of particle size generally should be that at least about 90 to 95% is about 44 microns or less. The 44 micron size is about the size of the openings in 325 mesh screens. Generally, the finely divided graphite is used in a weight ratio of graphite to siloxane of about 1/1 to 2/1 and preferably about 1.2/1 to 1.8/1.

The solution composition of the present invention is easy to use and, after application to the hot glass contacting surface such as the inner cavity of a mold or a bottom plate or tongs or pusher bar in the manufacture of glass articles including containers, can be cured at room temperature. While not wishing to be bound by theory, when applying the solution composition to glass forming molds, it is believed that when the solution comes into contact with the inner cavity mold surfaces, the coating is momentarily wet so that voids will not occur. The solvent rapidly evaporates and the coating cures rapidly so that the coated mold is ready to be put on an I.S. machine. The time from spraying the solution composition onto a mold and the use of the cured coating on the mold is sometimes as short as about 15 to 20 minutes. In addition to rapidly curing at room temperature, the organic solvent solution is easy to spray and eliminates the use of aqueous system that causes the molds to rust.

A preferred solution composition is as follows:

| INGREDIENT | GRAMS |
| --- | --- |
| n-butanol | 1400—1500 |
| NaOH | 38—46 |
| Organopolysiloxane in xylene defined above | 1100—1200 |
| Graphite, particle size about 5 to 150 microns | 1200—1300 |

The following examples illustrate the present invention:

EXAMPLE 1

A dispersion was prepared by intimately combining about 1450 grams n-butanol, 1150 grams R-630 resin (a 60% solid by weight solution of a hydrolysis product of methyltriethoxysilane, phenyltriethoxysilane and dimethyldiethoxy silane dissolved in xylene) 42 grams of NaOH, and 1250 grams GR-38 non-colloidal graphite (Union Carbide). The dispersion was sprayed onto cavity-defining metal surfaces of blank molds. Following solvent evaporation, the final curing of the organopolysiloxane took place at room temperature in 45 minutes. The molds were used successfully as blank molds on an I.S. machine without the need for curing for 1½ hours or so at a high temperature of 600°–650° F. in an oven.

EXAMPLE 2

A solid lubricant coating for glass forming molds was made as described in Example 1 except the dispersion was as follows:

| INGREDIENTS | % BY WT. |
| --- | --- |
| R-630 resin (60% solids in xylene) | 15.2 |
| Xylene | 10.2 |
| n-propanol | 32.8 |
| n-hexanol | 2.1 |
| n-butanol | 8.0 |
| NaOH | 1.4 |
| Graphite, Asbury A-98 | 26.0 |
| Graphite, Dixon 200-42 | 4.4 |

The NaOH to resin weight ratio was about 1/10.9. The graphite resin ratio was 2/1 and total % solids in the dispersion was 47.0%.

The dispersion was sprayed on and used within about 20 minutes, the resin curing rapidly in air at room temperature.

The solid lubricant coatings were very satisfactory, lasting many hours in the glass forming environment.

A dispersion as above described was stored in a plant intended for later use as solid lubricant coatings. Apparently, there was too much water in the dispersion and it gelled prematurely before being used. A dispersion was prepared using R-950 (all phenyltriethoxysilane) resin in place of the R-630 resin. The dispersion was not stable, the organopolysiloxane gelling prematurely. A test indicated the solvent-soluble R-950 resin had 12.5 by weight SiOH groups which is not satisfactory.

The outstanding coatings of the present invention can be cured as low as room temperature in 1 hour or less, often in 45 minutes to 30 minutes, or even 15 to 20 minutes as in the case of coating blank molds for use in an I.S. machine.

What is claimed is:

1. A process for coating hot glass-contacting surfaces of forming and handling equipment for making glass articles, the process comprising: (a) forming a hot glass-contacting layer on the glass-contacting surface, the layer comprising graphite dispersed in a thermoset organopolysiloxane binder thereon, said layer having a thickness of about 1½ to about 3 mils, and formed by:
   (1) applying unto the hot glass-contacting surface a non-aqueous composition consisting essentially of finely divided graphite dispersed in an organic solvent solution of a solvent-soluble, thermosettable, further-curable, non-gelled, organopolysiloxane and less then about 15% by weight, based on the organopolysiloxane, of NaOH to make the solution alkaline, said graphite having a particle size of about ½ to 150 microns and at least 90% having a particle size of 44 microns or less, and the weight ratio of said graphite to said organopolysiloxane being between 1/1 to about 2/1, and
   (2) curing said organopolysiloxane, without gelling, at a temperature as low as room temperature to a cured condition so as to provide a cured coating on the hot glass-contacting surface.

2. A process as defined in claim 1 in which the solvent-soluble organopolysiloxane has about 8.5 wt.% SiOH groups and the weight ratio of NaOH to organopolysiloxane is about 1 to 10.9.

3. A process for coating hot glass-contacting surfaces of hot glass forming and handling equipment including a blank mold for making a glass container or coating a bottom plate used for further forming the glass container, said hot glass-contacting surface coating consisting of a layer of graphite dispersed in a thermoset organopolysiloxane binder, said layer having a thickness of about 2 to about 3 mils, and formed by:
  (1) applying unto the hot glass-contacting surface a non-aqueous composition comprising finely divided graphite dispersed in an organic solvent solution of a solvent-soluble, further-curable organopolysiloxane and less than about 15% by weight, based on the organopolysiloxane, of NaOH, said graphite having a particle size of about ½ to 150 microns, and the weight ratio of said graphite to said organopolysiloxane being between about 1/1 to about 2/1, said organopolysiloxane having an R/Si ratio of 1/1, or more, up to less than 2/1, wherein R represents the organic moieties bonded to silicon atoms, and
  (2) curing said organopolysiloxane, without gelling, at a temperature as low as room temperature to a cross-linked condition so as to provide said hot glass-contacting surface with said layer.

4. A process as defined in claim 3 in which the curing at room temperature is done at less than one hour.

5. A process as defined in claim 3 in which the organopolysiloxane is the hydrolysis product of methyltriethoxysilane, phenyltriethoxysilane and dimethyldiethoxysilane, the product having about 1 to 11 wt. % SiOH groups, the NaOH being used in an amount of about 1 weight part per 14 to 20 weight parts of the solvent-soluble organopolysiloxane.

6. A process as defined in claim 3 in which the weight ratio of graphite to organopolysiloxane is about 1/1 to 1.8/1.

7. A process as defined in claim 1 in which the organopolysiloxane is cured in air at room temperature in less than 1 hour, the solution having about 55 to 65 wt. % solids, and the coating composition containing the following ingredients in approximate weight in grams:

| Ingredient | Grams |
| --- | --- |
| n-butanol | 1400—1500 |
| NaOH | 38—46 |
| Organopolysiloxane in xylene defined above | 1100—1200 |
| Graphite, particle size about 5 to 150 microns | 1200—1300 |

8. A process for coating hot glass-contacting surfaces of forming and handling equipment for making glass articles in which the process comprises the forming of a hot glass-contacting layer on the glass-contacting surface, the process comprising the steps of:
  (A) applying onto the hot glass-contacting surface a non-aqueous composition for coating hot glass-contacting surfaces of hot glass handling and forming equipment with a solid film lubricant, the composition comprising:
    A. a precured concentrated liquid siloxane partial condensation product, that is solvent-soluble and further curable, the condensation product being formed without gelling,
    B. finely divided graphite,
    C. a solvent for the condensation product, and
    D. NaOH, in an amount sufficient to prevent premature gelling to form a coating, and
  (B) curing the coating of the composition, without gelling, at a temperature as low as room temperature to provide a cured coating on the hot glass-contacting surface.

9. A process as defined in claim 7 in which the curing at room temperature is done at less than about 1 hour.

* * * * *